Dec. 21, 1954  J. A. PETRIE  2,697,382
HOB SHIFTING MECHANISM
Filed Oct. 14, 1950  3 Sheets-Sheet 1

INVENTOR.
Jacob A. Petrie
BY
ATTORNEYS

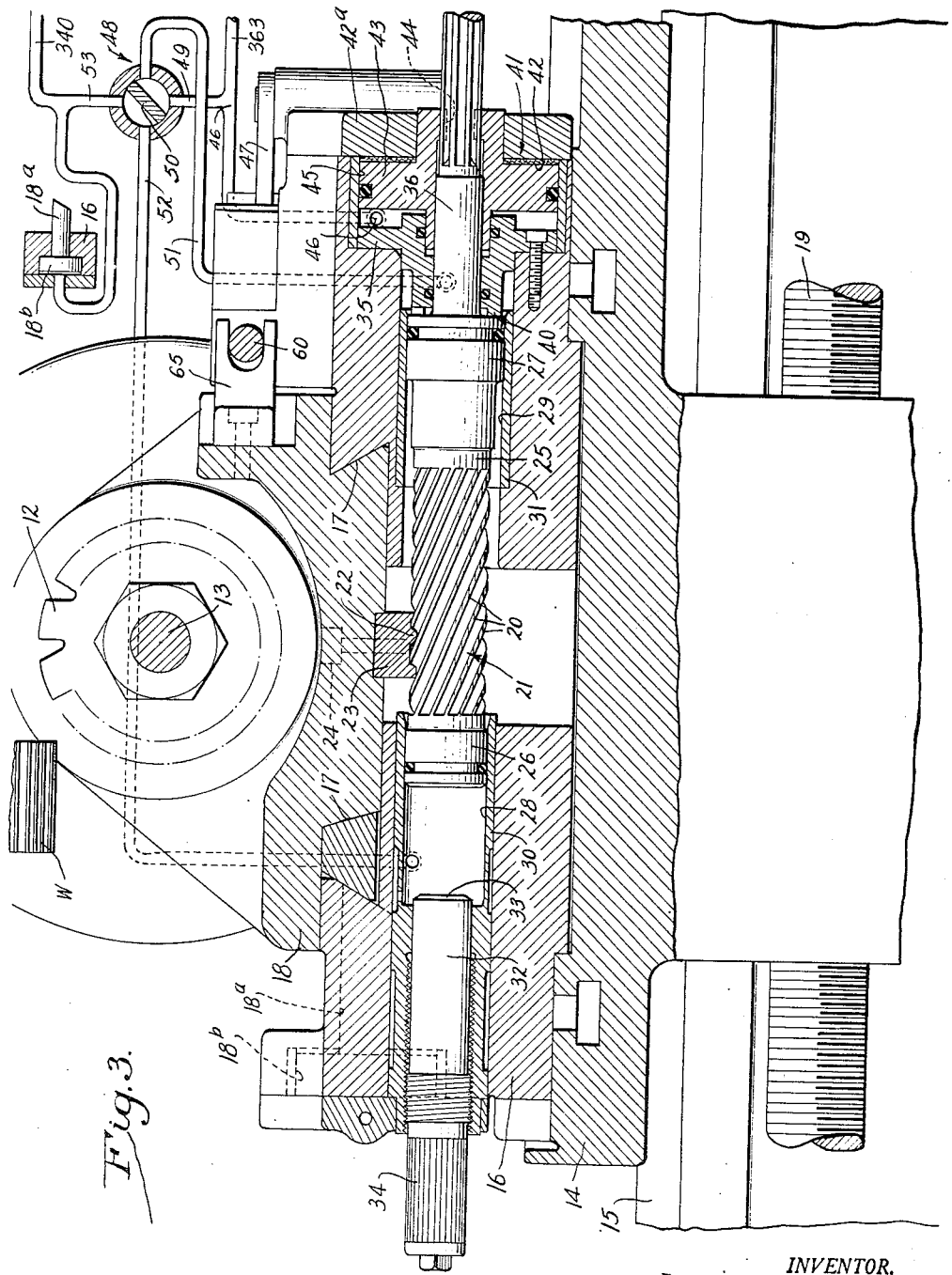

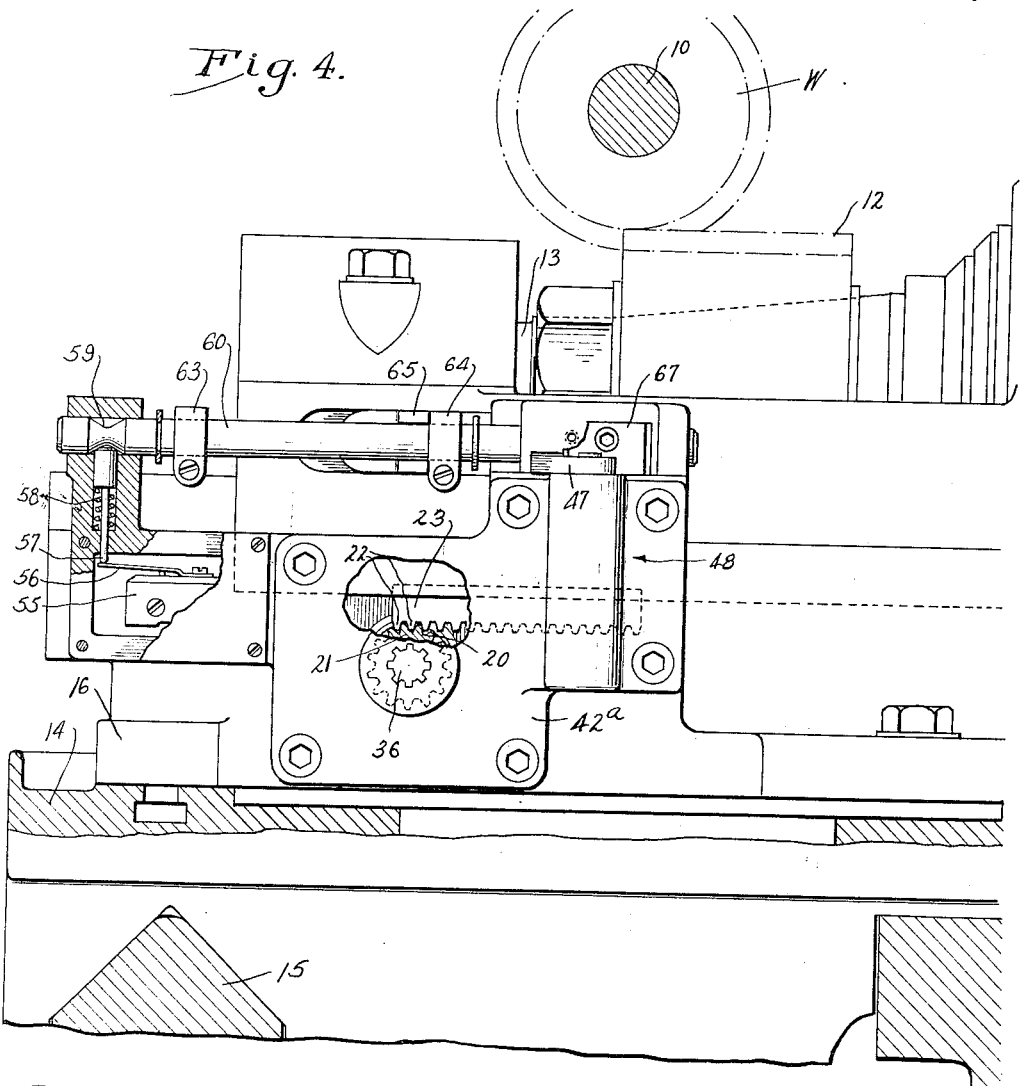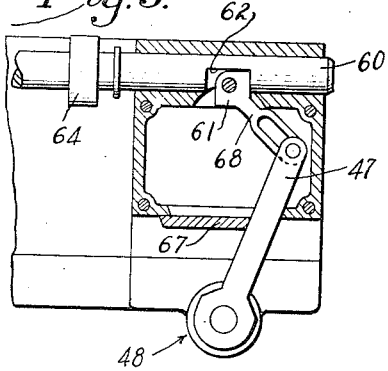

United States Patent Office 2,697,382
Patented Dec. 21, 1954

2,697,382

HOB SHIFTING MECHANISM

Jacob A. Petrie, New Brighton, Minn., assignor to Barber-Colman Company, Rockford, Ill., a corporation of Illinois Application October 14, 1950, Serial No. 190,160

13 Claims. (Cl. 90—4)

This invention relates to a mechanism by which the hob in a hobbing machine may be shifted axially in very small and predetermined increments to bring new sections of the hob periphery successively into operative association with the work thus causing an even amount of wear on all of the hob teeth.

One object is to derive the hob shifting movement from a reciprocatory power actuator through the medium of a new and simple cam mechanism.

A more detailed object is to utilize a helical gear as the cam and actuate the same by successive energizations of a hydraulic actuator.

Another object is to provide a novel mechanism for rendering the cam operative in response to movements of the hydraulic actuator in one direction only.

A further object is to provide a mechanism of the above character incorporating a novel manually operable means for enabling the hob to be shifted step-by-step in either direction selectively.

Other objects and advantages of the invention will become apparent from the following detailed description taken in connection with the accompanying drawings, in which Figure 1 is a fragmentary frontal elevational view of a hobbing machine embodying the novel features of the present invention.

Fig. 3 is a fragmentary sectional view taken along the line 3—3 of Fig. 2.

Fig. 4 is a fragmentary side view of the hobbing machine with parts thereof broken away and shown in section.

Fig. 5 is a fragmentary view of the reversing valve mechanism.

Figure 1:
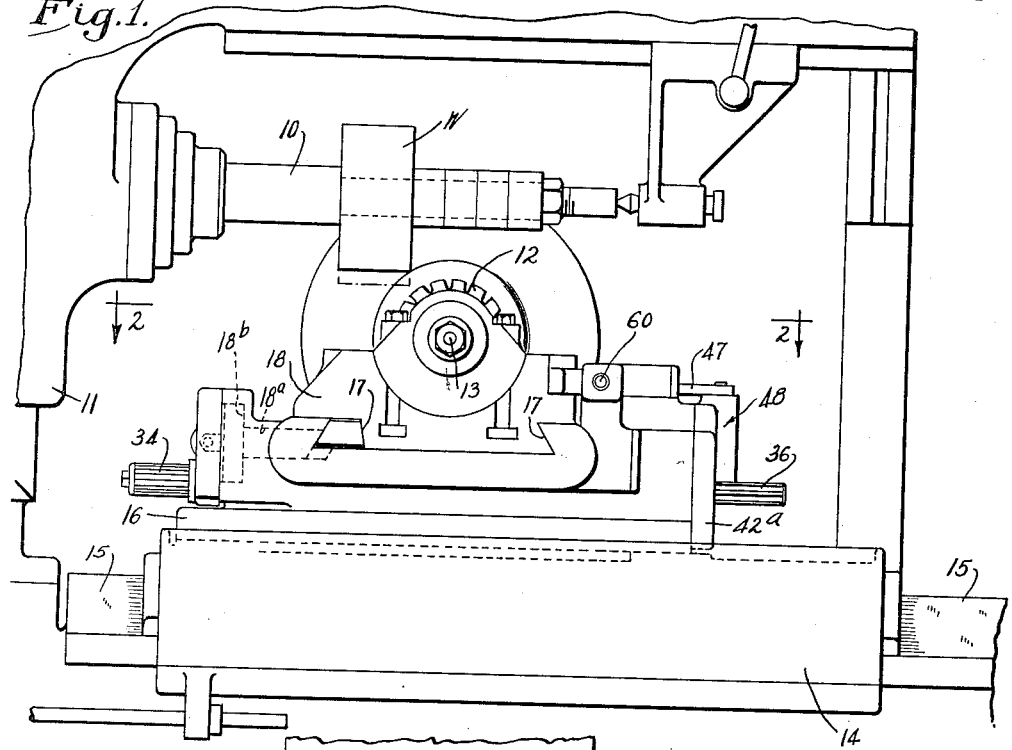

For purposes of illustration, the invention is shown in the drawings incorporated in an automatic hobbing machine of the type shown in Patent No. 2,356,796 to which reference may be had for details of the power actuators and the manner of their control to cause the machine elements to execute a complete hobbing cycle automatically. In machines of this type, the work or gear blank W to be hobbed is secured to a horizontal spindle 10 supported on the vertically movable work slide 11 and power driven in synchronism with a hob 12 which is fast on a spindle 13. The latter is rotatably supported on a slide 14 guided along bed ways 15 which parallel the work spindle 10. A swivel plate 16 is mounted on the slide 14 for angular adjustment about a vertical axis and is formed with diametrical guideways 17 adjustably supporting a slide 18 rotatably supporting the hob spindle 13. This slide may be clamped rigidly in the ways 17 by a plunger 18a (Fig. 3) slidably mounted on the swivel plate 16 and pressed against a part of the hob slide 18 whenever pressure fluid is admitted to the cylinder of its hydraulic actuator 18b.

In the normal hobbing cycle, the slide 14 is advanced by a screw 19 to move the rotating hob across the rotating workpiece and then, after raising of the work slide 11, the slide is rapidly returned to the right as viewed in Fig. 1, preparatory to hobbing the next workpiece. The mechanism for effecting the various motions between the work and the hob to execute an automatic cycle are fully disclosed in the aforesaid patent.

To insure even wearing of the hob teeth and the hobbing of as many gears as possible for each sharpening of the hob, it is desirable, after the completion of each cycle, to advance the hob slide 18 along the ways 17 through an extremely short but accurately controlled increment, for example .003 of an inch. In accordance with the present invention, such step by step shifting of the hob is effected by a novel cam mechanism which is actuated in response to movement of a reciprocatory power actuator in one direction but remains ineffectual during the return stroke of the actuator. To simplify manufacture and enable the cam to be actuated conveniently by a reciprocatory operator, it preferably comprises teeth 20 on an elongated helical gear 21 (Figs. 3 and 6) mounted for endwise axial movement transversely of the hob axis and meshing with mating teeth 22 on a rack 23 which is secured as by screws 24 to the under side of the hob slide 18 and extends longitudinally of the latter paralleling the hob axis. In the present instance, the teeth 20 have a helix angle of about 22 degrees.

The helical gear teeth are cut on a shaft 25 whose opposite end portions form pistons 26 and 27 slidable in cylinders 28 and 29 which are defined by bushings 30 and 31 mounted in the swivel plate 16. A rod 32 is threaded through the closed outer end of the bushing 30 and its inner end 33 forms a stop for limiting the stroke of the piston 26 which stroke may be adjusted by turning a knurled knob 34 on the outer end of the rod.

The outer end of the cylinder 29 is covered by a cap 35 which is fixed to the swivel plate 16 and apertured to slidably receive a reduced end portion 36 of the shaft 25 which projects outwardly from the plate 16 for engagement of its outer fluted end by a wrench or other tool by which the shaft and the helical gear 25 may be turned to advance or retract the rack 23 and the hob manually. The inner end 40 of a hub on the cap 35 is engageable with the piston 27 to limit the movement of the gear 21 in the opposite direction.

It will be apparent that the cylinders 28, 29 and the pistons 26, 27 form a reciprocable hydraulic actuator for shifting the gear 21 endwise and thereby causing the teeth thereof to exert a cam action on the teeth of the rack 23 thereby moving the slide 18 and the hob axially. The amount of this shift is determined by the stroke of the pistons which may be adjusted by screwing the rod 32 in or out thus changing the position of the stop 33 which is usually made adjustable through a range of zero to about two inches. With the gear having a helix angle of about 22 degrees, the hob shift would be from zero to about ⅞ of an inch.

Provision is made for disabling the hydraulic actuator above described during one of its strokes so that in successive back and forth movements of the pistons, the hob will be advanced step-by-step in one direction thus enabling corresponding portions of the hob teeth along the full length of the hob to be brought into operative association with the work. For this purpose, means is provided for holding the gear shaft 25 against turning during one of its strokes while releasing the gear for free turning during the reverse stroke of the pistons. Herein this means takes the form of a friction brake 41 which has a power actuator energized and deenergized automatically at proper times in the automatic cycle of the hobbing machine.

The brake shown herein comprises a nonrotatable friction surface 42 on a plate 42a secured to the swivel 16 and coacting with an opposed surface on a piston 43 slidable along the shaft portion 36 and spline coupled to the latter at 44. The piston is substantially larger in diameter than the piston 27 and is slidable in a cylinder 45 outwardly beyond the cap 35 by which the inner end of the cylinder is closed. When pressure fluid is admitted to the inner end of the cylinder through a passage 46, the friction surfaces are pressed together and the gear 21 is effectually held against turning thus causing the gear teeth to cam the rack forwardly. During axial movement of the pistons when the pressure on the brake piston 43 is relieved, the gear and the pistons will be relatively free or at least sufficiently free to turn against the resistance offered by the rack and the associated hob slide 18. The gear is thus rendered ineffectual to shift the hob whenever the brake 41 is released.

Whenever pressure fluid is admitted to the passage 46 and the brake cylinder 45, the pressure is also applied to one or the other end of the actuator for the gear cam 21 depending on the position of the actuating lever 47 of a reversing valve 48 to which the passage 46 is connected through a conduit 49. In the position of the parts shown in Figs. 2 and 3, the movable member 50 of the valve is located so as to connect the passage 49 to a conduit 51 leading to the outer end of the cylinder 29. At the same time, a conduit 52 leading from the outer end of the cylinder 28 is connected to a passage 53 which is also joined to the cylinder of the actuator 18$^b$ for the hob slide clamp. By turning the valve lever 47 to the position shown in Fig. 5, the connections are reversed, the conduit 51 then communicating with the passage 53 while the cylinder 28 is joined to the line 46 and the brake cylinder 45.

The hob shifting cam 21 may be advanced and idly retracted automatically by interconnecting the fluid passages 46 and 53 with the hydraulic actuators for other parts of the hobbing machine. This may be accomplished with a hobbing machine of the type shown in Patent No. 2,356,796 simply by connecting the passages 46 and 53 to the conduits numbered 363 and 340 respectively in the patent. With such connections, high pressure fluid would be applied to the line 46 when, after cutting of the gear is completed, the work slide 11 is raised to shift the valve 347 of the patent and admit pressure fluid to the cylinder 158 for energizing the actuator by which the rapid traverse clutch 144 is engaged. At this time, the line 340 is open to the drain. The latter line in the patented machine receives high pressure fluid and the line 363 is drained at the start of the next machine cycle after the work slide 11 has been lowered against its stop and sufficient pressure has built up to operate the resistance valve 339 by which fluid is admitted to the line 340.

As a result of the connections described above and with the valve 48 positioned as shown in Fig. 3, the gear 21 will be shifted to the left and against the stop 33 at the end of each hobbing cycle when the work is out of engagement with the hob. Since at this time the clamp actuator 18$^b$ is deenergized, and the brake 41 is applied to hold the gear against turning, the teeth 20 will be effective to cam the rack and the hob axially a distance determined by the position of the stop 33. Then, after the next cycle has been initiated, the gear is returned idly and to the right against the stop 40 by the admission of pressure fluid against the piston 26 while the clamp 18$^a$ is holding the hob slide 18 locked in its ways and the brake 41 is released permitting the gear to turn about its axis. The gear teeth thus follow the slope of the rack teeth without applying any substantial force to the latter.

Shifting of the hob as described above is repeated in each hobbing cycle and, with the type of cam mechanism shown, the successive increments may be very short, for example, .003 of an inch, while being maintained of precisely the same length. Thus, by adjustment of the stroke of the cam in accordance with the characteristics of the work and cutting materials it is only necessary to axially shift the hob once across the work while completing the maximum number of pieces capable of being produced for each sharpening of the hob.

When, by axial step-by-step shifting as described above, the full length of the hob has been used, the hobbing machine is stopped automatically preparatory to replacement of the hob and resetting of the machine for a new series of cycles. This may be accomplished by opening a normally closed switch 55 (Fig. 4) controlling the circuit of the main driving motor of the hobbing machine. The switch is mounted on the swivel plate 16 with its actuating arm 56 bearing against a pin 57 which is urged upwardly by a spring 58 and constitutes a cam follower. The upper end of the pin is adapted to enter a cam notch 59 on a rod 60 which parallels the hob axis and is supported on the swivel plate 16 for limited endwise movement determined by a stop 61 (Fig. 5) projecting into a notch 62 in the rod 60. The latter carries spaced adjustable collars 63 and 64 engageable with an intervening arm 65 which projects rigidly from the hob slide 18.

Figure 2:
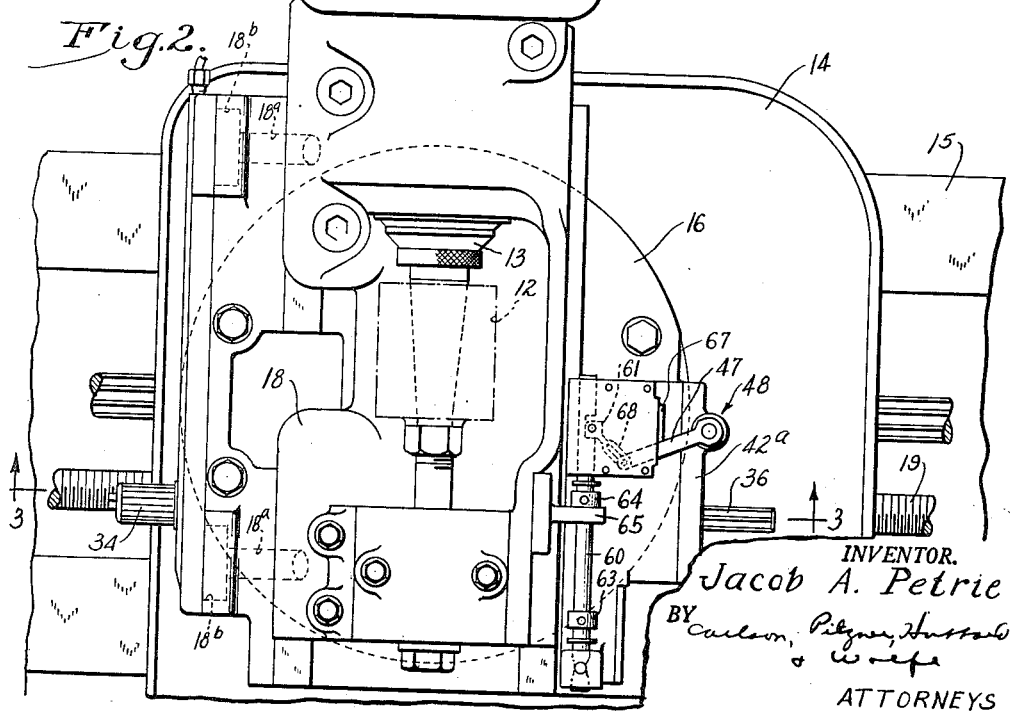
Fig. 2 is a fragmentary sectional view taken along the line 2—2 of Fig. 1.

With the parts positioned as shown in Figs. 2 and 4, the hob slide 18 is positioned relative to the swivel plate 16 for the start of the first machine cycle with a new hob. At this time, the follower 57 is seated in the cam notch 59 allowing the motor control switch 55 to close, the arm 65 being at its right hand limit of travel. As the successive machine cycles are executed, the hob slide is advanced step by step to the left (Fig. 4) until after the full length of the hob has been used up, the arm 65 engages the collar 63 and, in the ensuing shift of the hob, moves the rod 60 far enough to cause the pin 57 to be cammed downwardly thus opening the switch 55 to disable the machine. After replacement of the dulled hob, the operator, by applying a wrench to and turning the shaft extension 36, may retract the hob slide 18 until the arm 65 engages the collar 64 and shifts the rod 60 to the right against the stop 61. The cam notch 59 is again presented to the pin 57 thus allowing the switch 55 to close.

If, depending on the character of the work being hobbed, it is desirable to shift the hob step by step in the reverse direction or to the right as viewed in Fig. 4, it is only necessary to reverse the valve 48. This may be accomplished by removing a detachable lock plate 67 (Figs. 2 and 5) and swinging the lever to the position shown in Fig. 5. Then, the valve 48 will admit pressure fluid to the cylinder 28 at the end of each machine cycle when the brake 41 is energized and the clamp 18$^a$ is released. When, at the start of the next cycle, pressure fluid is admitted to the passage 53, the clamp 18$^a$ will be energized, the brake will be released, and fluid will be admitted to the cylinder 29 to effect idle retraction of the cam gear 21.

As an incident to reversing the position of the lever 47, an arm 68 (Fig. 5) pivotally connected therewith swings the pivoted stop 61 so as to correspondingly change the range of the stop motion of the rod 60 as permitted by the notch 62 cooperating with the stop. Then, after the arm 65 on the hob slide 18 reaches the collar 64, the rod 60 will be shifted to the right in the next shift of the hob slide, thus opening the switch 55 to disable the machine and indicate to the operator that the hob has been used up.

It will be apparent that the mechanism required for shifting the hob axially has, as compared to prior constructions, been simplified greatly. At the same time, the mechanism is rugged in construction, economical to manufacture, accurate and uniform in operation and readily adjustable for a wide variety of service conditions.

I claim as my invention:

1. The combination with a hobbing machine having a slide adapted to support a rotary hob, a member supporting said slide for movement parallel to the hob axis, a clamp for locking said slide in said member, a power operator for said clamp, a rack on said slide extending parallel to the hob axis, a helical gear meshing with the teeth of said rack and mounted on said member for rotary movement and also for endwise movement, a cylinder on said member axially alined with said gear, a piston on said gear slidable in said cylinder, a friction brake adapted when energized to resist turning of said gear, a power actuator for said brake, and means for admitting pressure fluid to one end of said cylinder while simultaneously controlling said operator and said actuator to release said clamp and apply said brake, said means acting to apply said clamp and release said brake when pressure fluid is admitted to the opposite end of said cylinder.

2. The combination with a hobbing machine having a slide adapted to support a rotary hob, a member supporting said slide for movement parallel to the hob axis, a power actuated clamp for holding said slide against movement, a rack on said slide extending parallel to the hob axis, a helical gear meshing with the teeth of said rack and mounted on said member for rotary movement and also for endwise movement, a hydraulic actuator for said gear including a cylinder and a piston therein, a power actuated brake adapted when energized to resist turning of said gear, and means for admitting pressure fluid to said cylinder to advance said gear in one direction while simultaneously releasing said clamp and applying said brake.

3. The combination with a hobbing machine having a slide adapted to support a rotary hob, a member supporting said slide for movement parallel to the hob axis, a rack on said slide extending parallel to the hob axis, a helical gear meshing with the teeth of said rack and mounted on said member for rotary movement and also for endwise movement, a hydraulic actuator for said gear including a cylinder and a piston thereon one mounted on said member in axial alinement with said gear and the other on said gear, a stop selectively adjustable to vary the stroke of said piston, a friction brake adapted when energized to resist turning of said gear, a hydraulic actuator for energizing and releasing said brake, and means by which pressure fluid may be admitted to either end of said cylinder selectively to move said gear in one direction or the other, and means for admitting pressure fluid to said actuator when and releasing the same from said actuator when pressure is applied to the respective ends of said cylinder through said first mentioned means.

4. The combination with a hobbing machine having a slide adapted to support a rotary hob, a member supporting said slide for movement parallel to the hob axis, a rack on said slide extending parallel to the hob axis, a helical gear meshing with the teeth of said rack and mounted on said member for rotary movement and also for endwise movement, a cylinder on said member axially alined with said gear, a piston on said gear slidable in said cylinder through a predetermined range, a brake adapted when energized to resist turning of said gear, a hydraulic actuator for energizing and releasing said brake, and means for admitting pressure fluid to said cylinder to advance said gear in one direction and simultaneously admitting the fluid to said actuator to hold said brake applied.

5. The combination with a hobbing machine having a slide for rotatably supporting a hob, a member supporting said slide for movement in a direction parallel to the axis of the hob, a rack rigid with said slide, a helical gear meshing with said rack and mounted on said member for rotary and axial movement relative thereto, a power actuator for moving said gear back and forth, a brake for holding said gear against turning, and means operable during the advancing and retracting movements of the gear to respectively apply and release said brake.

6. The combination with a hobbing machine having a slide adapted to support a rotary hob, a member supporting said slide for movement parallel to the hob axis, a cam follower on said slide, a cam mounted on said member for rotary movement and also for endwise movement and having an inclined surface engageable with said follower and operable to advance said slide during endwise movement of the cam while the latter is held against turning, a cylinder on said member axially alined with said cam, a piston on said cam slidable in said cylinder, a brake adapted when energized to resist turning of said cam, means for applying pressure fluid to either end of said cylinder to advance said cam in one direction or the other, and means for applying said brake during the active stroke of said cam and releasing the brake during the return stroke.

7. The combination with a hobbing machine having a slide adapted to support a rotary hob, a member supporting said slide for movement parallel to the hob axis, a cam follower on said slide, a cam mounted on said member for rotary movement and also for endwise movement and having an inclined surface engageable with said follower and operable to advance said slide during endwise movement of the cam in one direction while the cam is held against turning, a hydraulic actuator for moving said cam back and forth including a cylinder and a piston one mounted on said cam for movement therewith, a brake for holding said cam against turning, means operable to energize said actuator to move said cam in one direction and advance said slide, and means for applying said brake during said advance and for releasing the brake during the return movement of the cam.

8. The combination with a hobbing machine having a slide adapted to support a rotary hob, a member supporting said slide for movement parallel to the hob axis, a cam follower on said slide, a cam mounted on said member for rotary movement and also for endwise movement and having an inclined surface engageable with said follower and operable to advance said slide during endwise movement of the cam in one direction while the cam is held against turning, a hydraulic actuator for moving said cam back and forth including a cylinder and a piston one mounted on said cam for movement therewith, a brake for holding said cam against turning, means operable to energize said actuator to move said cam in one direction and advance said slide, a hydraulic operator for applying said brake, when energized, and means for energizing said operator during the advance of said cam by said actuator.

9. The combination with a hobbing machine having a slide adapted to support a rotary hob, a member supporting said slide for movement parallel to the hob axis, a cam follower on said slide, a cam mounted on said member for rotary movement and also for endwise movement and having an inclined surface engageable with said follower and operable to advance said slide during endwise movement of the cam in one direction while the cam is held against turning, a power actuator for moving said cam back and forth, a brake for holding said cam against turning, and means operable during the advancing and retracting movements of said cam to respectively apply and release said brake.

10. The combination with a hobbing machine having a slide adapted to support a rotary hob, a member supporting said slide for movement parallel to the hob axis, a cam follower on said slide, a cam mounted on said member for rotary movement and also for endwise movement and having an inclined surface engageable with said follower and operable to advance said slide during endwise movement of the cam while the latter is held against turning, and power actuated mechanism for reciprocating said cam back and forth while holding the same against turning during one stroke and freeing the cam for turning during the opposite stroke.

11. The combination with a hobbing machine having a slide adapted to support a rotary hob, a member supporting said slide for movement parallel to the hob axis, a cam follower on said slide, a cam mounted on said member for rotary movement and also for endwise movement and having an inclined surface engageable with said follower and operable to advance said slide during endwise movement of the cam in either direction while the latter is held against turning, a hydraulic actuator for reciprocating said cam including a cylinder and a piston slidable therein, a brake for holding said cam against turning, a hydraulic operator for said brake, means for applying pressure fluid alternately to opposite ends of said cylinder to advance and retract said cam, means for applying said brake during the one stroke of said cam and releasing the brake during the opposite stroke, and a valve selectively operable to reverse the fluid connections between said cylinder and said brake whereby to cause release of said brake during said first cam stroke and application of the brake during the other cam stroke.

12. The combination with a hobbing machine having a slide adapted to support a rotary hob, a member supporting said slide for movement parallel to the hob axis, a cam follower on said slide, a cam mounted on said member for rotary movement and also for endwise movement and having an inclined surface engageable with said follower and operable to advance said slide during endwise movement of the cam in either direction while the cam is held against turning, a power actuator for reciprocating said cam back and forth, a brake adapted for holding said cam against turning, means for applying said brake during one stroke of said cam and releasing the brake during the return stroke, and selectively operable means by which the action of said brake relative to the strokes of said cam may be reversed.

13. The combination of, a tool slide adapted to support a rotary spindle, a member supporting said slide for movement parallel to the axis of said spindle, a cam follower rigid with said slide on the side thereof opposite said spindle, a cam mounted on said member for rotary movement around and also for endwise movement along an axis spaced from and extended transversely across said spindle axis, said cam having an inclined surface engageable with said follower and operable to advance said slide along said first axis during endwise movement of the cam along said second axis while the cam is held against turning, a stop supported on said member for movement back and forth along said second axis, and means projecting from said member and manually operable to adjust the position of said stop along said second axis and thereby vary the stroke of said cam.

References Cited in the file of this patent

UNITED STATES PATENTS

| Number | Name | Date |
| --- | --- | --- |
| 2,348,805 | Gigger | May 16, 1944 |
| 2,481,974 | Bradner | Sept. 13, 1949 |
| 2,483,810 | Cotta | Oct. 4, 1949 |
| 2,484,856 | Purvin | Oct. 18, 1949 |
| 2,629,290 | Staples et al. | Feb. 24, 1953 |